United States Patent
Amendola

(10) Patent No.: US 7,799,315 B2
(45) Date of Patent: Sep. 21, 2010

(54) THERMOCHEMICAL HYDROGEN PRODUCED FROM A VANADIUM DECOMPOSITION CYCLE

(76) Inventor: Steven Amendola, 22 Lambert Johnson Dr., Ocean, NJ (US) 07712

( * ) Notice: Subject to any disclaimer, the term of this patent is extended or adjusted under 35 U.S.C. 154(b) by 1535 days.

(21) Appl. No.: 10/868,257

(22) Filed: Jun. 14, 2004

(65) Prior Publication Data
US 2005/0013771 A1 Jan. 20, 2005

Related U.S. Application Data

(60) Provisional application No. 60/477,499, filed on Jun. 11, 2003, provisional application No. 60/552,431, filed on Mar. 11, 2004, provisional application No. 60/556,191, filed on Mar. 25, 2004.

(51) Int. Cl.
*C01G 23/02* (2006.01)
*C01G 49/10* (2006.01)
*C01B 3/08* (2006.01)
*C01B 3/00* (2006.01)

(52) U.S. Cl. ............... 423/657; 423/648.1; 423/658; 423/658.2; 423/492; 423/493

(58) Field of Classification Search ............ 423/658.2, 423/657, 648.1, 658, 492, 493
See application file for complete search history.

(56) References Cited

U.S. PATENT DOCUMENTS 2,519,034 A * 8/1950 Elmore et al. ............ 526/226
4,075,313 A * 2/1978 Pangborn et al. ............ 423/658
4,180,555 A 12/1979 Bamberger et al.
4,663,144 A * 5/1987 McQuillan et al. .......... 423/579
4,822,589 A * 4/1989 Kiyoura et al. ............ 423/502
5,980,753 A * 11/1999 Itano et al. ................. 210/670
6,517,806 B2 2/2003 Park et al.
6,534,033 B1 * 3/2003 Amendola et al. ........ 423/648.1
2005/0013771 A1 * 1/2005 Amendola ............... 423/658.2

OTHER PUBLICATIONS

Ramachandran et al. "An overview of industrial uses of hydrogen", Int. J. Hydrogen Energy, vol. 23, No. 7, pp. 593-598. 1998.*
Author Unknown. "Chapter 3: Production of Hydrogen". pp. 14-59 (1974).*
Ulrichson et al. "Thermochemical Water Splitting: The Reverse Deacon Reaction and Alternatives". pp. 55-61, 64 (1975).*
Funk "Thermodynamics of Multi-Step Water Decomposition Processes" ACS Symposium on Non-Fossil Fuels, vol. 16, No. 4, p. 79, American Chemical Society, 1972.*

* cited by examiner

*Primary Examiner*—Jerry Lorengo
*Assistant Examiner*—Jennifer A Smith
(74) *Attorney, Agent, or Firm*—Baker Botts LLP

(57) ABSTRACT

A thermochemical water-splitting process all reactions of which operate at relatively low temperatures and high efficiencies, and in which relatively inexpensive materials and processing methods are made possible. This invention involves the decomposition of a metal halide compound, i.e., one which is capable of being reduced from a higher oxidation state to lower oxidation state, e.g. vanadium chloride III→vanadium dichloride. The process is cyclic and regenerative, and the only net inputs are water and heat; and the only net outputs are hydrogen and oxygen. The process makes it possible to utilize a wide variety of available heat, including solar, sources for the energy input.

23 Claims, 5 Drawing Sheets

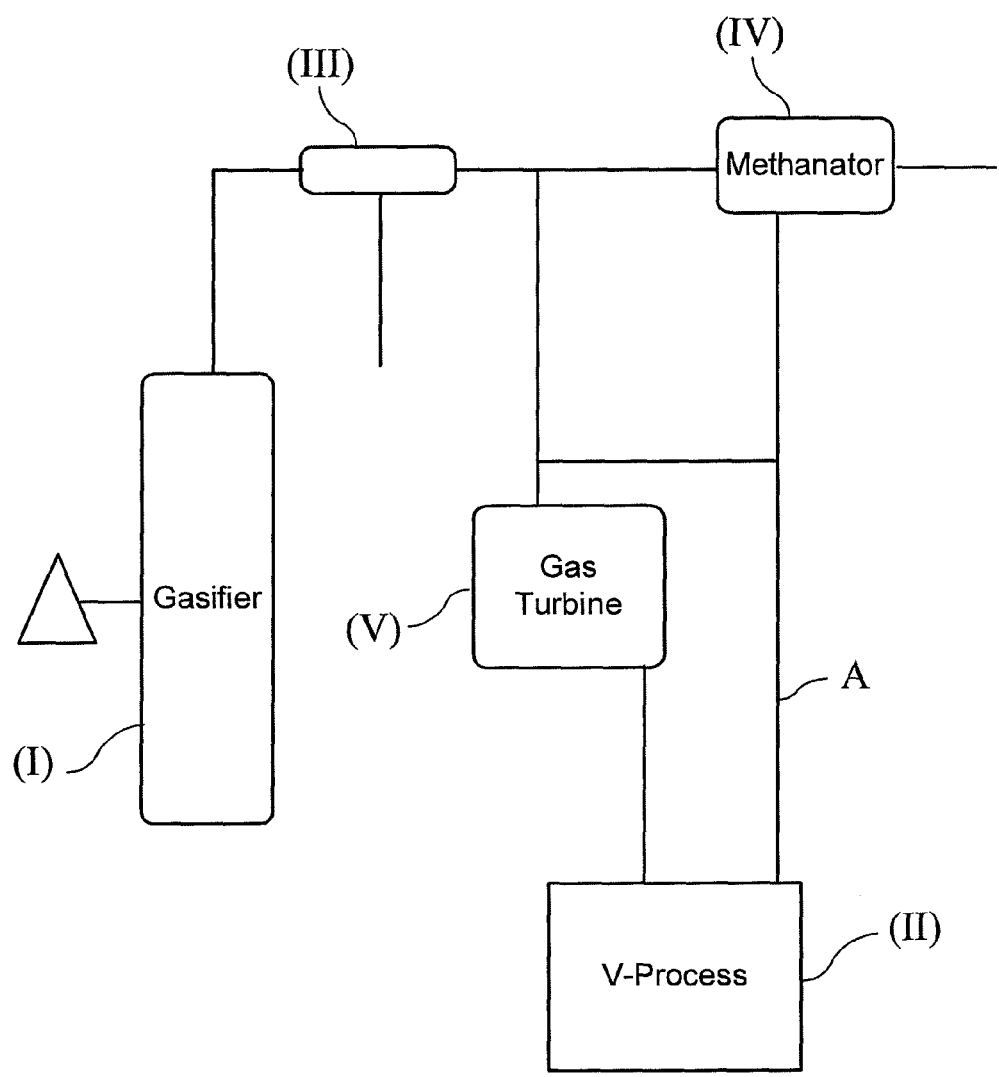
F I G. 5

THERMOCHEMICAL HYDROGEN PRODUCED FROM A VANADIUM DECOMPOSITION CYCLE

CROSS REFERENCE TO RELATED APPLICATIONS

This application claims the benefit of U.S. Provisional Application Ser. No. 60/477,499 filed on Jun. 11, 2003; 60/552,431 filed on Mar. 11, 2004; and 60/556,191 filed on Mar. 25, 2004, respectively, all of which are incorporated herein by reference in their entireties The present invention relates to a thermochemical water-splitting process all reactions of which operate at relatively low temperatures and high efficiencies, and in which relatively inexpensive materials and processing methods are made possible. This invention involves the decomposition of a metal halide compound, i.e., one which is capable of being reduced from a higher oxidation state to lower oxidation state, e.g. vanadium chloride III→vanadium dichloride. The process is cyclic and regenerative, and the only net inputs are water and heat; and the only net outputs are hydrogen and oxygen. The process makes it possible to utilize a wide variety of available heat, including solar, sources for the energy input.

BACKGROUND OF THE INVENTION

Perhaps the most studied thermochemical water-splitting process is known as the sulfur-iodide process which operates at about 1000° C. This high temperature requirement cannot be reached economically with current-art concentrating solar thermal technologies, and does not allow the practical harvesting of thermal energy from other resources such as waste heat from turbines, low-quality combustible gases, and the like. Moreover, a process such as the Iodine-Sulfur process (I—S) operates with extremely corrosive materials. The expense of dealing with corrosion problems, as well as loss of a material as expensive as iodine, constitute significant drawbacks to using such a process.

Known low temperature processes, such as a copper chloride cycle require the use of silver chloride in its hydrogen cycle. Silver chloride is very expensive, and further, the silver must be removed and reprocessed in order to recover it. In a real world plant this fact alone guarantees unacceptable loses of silver. With silver at $80 per pound ($5.70/Tr Oz), and twice the molar requirement per mole of product hydrogen, the initial capital cost is commercially unacceptable. Moreover, it is possible that the silver losses alone could exceed the value of hydrogen produced.

Considerable interest in thermochemical water splitting cycles was shown in the 1960's and 70's when it was thought that heat from a nuclear reactor would be the source of energy and systems that had at least one high temperature step were widely explored. However, the practicality of using a nuclear power plant for the purpose of making hydrogen did not take into account the other more profitable uses of that heat. Furthermore, nuclear power has steadily fallen out of favor in the U.S. A key factor that was over-looked was the high temperatures required presented serious problems including the use of construction materials. This alone doomed most of the proposed systems. While the prospect of utilizing a high temperature seemed promising insofar as it could open the door to many reactions and possibly high rates, after examination of many potential cycles, the flaws which inherent in them became all too apparent, and none have been commercialized.

It is an object of the present invention to chose selectively, scaleable reactions at as low a temperature as possible to achieve a truly useful process that can utilize, among other sources, waste heat and thereby increase the efficiency of many energy sources as well as produce inexpensive hydrogen and oxygen.

SUMMARY OF THE INVENTION

According to the process of the present invention relatively low thermal energy, preferably less than about 600° C. is used to decompose, e.g., vanadium trichloride to vanadium dichloride and chlorine gas. The chlorine gas is reacted with steam to produce oxygen and HCl (sometimes called the "Reverse Deacon" reaction). The oxygen product and HCl are separated, and the equilibrium shifted by incorporating an acid absorbing material in the Reverse Deacon reactor for example by scrubbing with an acid-absorbing compound such as monoethanolamine. HCl is liberated from the monoethanolamine by heating, and is then reacted with the vanadium dichloride to produce hydrogen and vanadium trichloride. Thus, the vanadium trichloride is ready to begin the cycle again. Preferred embodiments of the present invention contemplate the use of catalysts, and the use of a double-salt of vanadium chloride, the effect of which enable the use of even lower temperatures in the first reaction, i.e., temperatures even below about 425° C. While the present invention will be generally discussed herein in connection with the decomposition of vanadium trichloride ($VCl_3$) and optionally an iron trichloride ($FeCl_3$) catalyst, other suitable metal halides and catalysts will be understood as useful in practicing the process of the present invention.

The process of the present invention, referred to as the "V-Process," offers several key advantages. For example, the relatively low temperature of operation allows the process to utilize known concentrating solar thermal energy, and other plentiful and advantageous energy sources, to make hydrogen. The low temperature also allows the use of relatively inexpensive materials for construction of plant equipment, and increases reliability of operation. The V-Process utilizes fairly inexpensive materials in the reactions, which materials are neither destroyed nor significantly lost in the process. For example, vanadium salts are relatively abundant and inexpensive. The processing steps and separations involved in the V-Process are simple, straightforward, and while individually known in general, have never been combined as in the V-Process for the generation of thermochemical hydrogen for use in the applications discussed below.

It is estimated that the V-Process can create hydrogen from thermal input at roughly 73% efficiency based on the lower heating value (LHV) of the product hydrogen, or 87% based on the higher heating value (HHV). If steam is available to feed the process instead of liquid water, then the efficiency can be raised to about 78% (LHV)/94% (HHV). When the process is integrated with energy input sources such as solar concentrators at high thermal efficiency, the result is the conversion of sunlight to hydrogen with an overall efficiency several times higher than the efficiency of photovoltaic modules integrated with electrolyzers. For instance, an advanced "power tower" (solar concentrator plant) integrated with the V-Process converts sunlight to hydrogen at an efficiency of about 34% (LHV, liquid water)/43% (HHV, steam). Higher efficiencies are possible using highly efficient solar concentrator technologies, properly engineered to facilitate integration. Thus it is believed that using the V-Process in combination with a large advanced future power tower concentrator facility, that hydrogen may be generated at a cost of less than $1.00 per kg. Nevertheless, the estimated cost of using solar technology which has a near-term availability is believed to be less than $2.00 per kg.

Due to the low operating temperature used in the V-Process, various heat sources and waste gases may be readily utilized as an energy input source. For instance, a significant proportion of the exhaust heat from a simple-cycle gas turbine power plant can be used. Even turbine exhaust heat well below 500° C. may still be useful in facilitating secondary reactions in the V-Process. Using such a low-cost source of heat, it is estimated that hydrogen could be produced for less than $0.50 per kg. Other energy sources include flue gases, waste heat from any chemical reactions wherein heat is available, foundry cooling processes, the burning of off-gases from a refinery and oil and natural gas wells, the intentional burning of lower BTU gases which produce a lower flame temperature than pure fuels, and the burning of any fuels for the purpose of generating hydrogen and oxygen.

The low operating temperatures used in the V-Process also allows the production of hydrogen using the thermal energy byproduct from a high-temperature fuel cell, such as a solid oxide or molten carbonate fuel cell. Accordingly, an integrated process enables the V-Process to be fed by solar or other suitable heat sources as a primary source of thermal energy, as disclosed above; the hydrogen and oxygen from the V-Process itself can serve as fuel for a high-temperature fuel cell, the thermal energy from the fuel cell being "recycled" back to the V-Process to generate more hydrogen. The result is a highly efficient, and low cost process for the production of electricity from solar thermal energy or other suitable heat sources.

The energy efficiency of the process of the present invention has been calculated by performing a heat and material balance, and plant energy balance based on a conceptual process design shown schematically in FIG. 1. If the water fed to the process is in liquid form (so that it must be vaporized within the process), the estimated efficiencies are: 73% for the LHV of hydrogen product divided by total energy input; and 87% for the HHV of hydrogen product divided by total energy input. If the water fed to the process is steam (when the plant is integrated with another process, or processes that can provide steam) the estimated efficiencies are: 78% for LHV of hydrogen product divided by total energy input; and 93% for HHV of hydrogen product divided by total energy input. Concentrating solar thermal technologies generally range in efficiency from about 45% efficiency to about 70% efficiency. If one multiplies this by the V-Process efficiency at 73% (LHV, liquid $H_2O$ input), the resulting efficiently of conversion of solar energy to hydrogen ranges from 33% to 51%. By contrast, the best commercial photovoltaic modules coupled with the most efficient electrolyzers have sunlight to hydrogen conversion efficiency of about 14%.

The thermochemical hydrogen production process in accordance with the present invention is based on the liberation of hydrogen using a metal halide in a cyclic, regenerative process which proceeds in three steps. As stated earlier, while the invention is hereinafter explained in the context of the initial thermal decomposition of vanadium trichloride, other suitable compounds may also be used. Accordingly, the first step of the V-Process is the decomposition of vanadium trichloride to vanadium dichloride and chlorine. This reaction proceeds through an intermediate of vanadium tetrachloride, but the entire reaction takes place in one vessel. The reaction is known in the literature to operate very rapidly at 550° C. without any catalysts; however it has now been found that the reaction proceeds well below 500° C. and thermodynamic calculations show that the thermal efficiency may well approach a temperature below 400° C. See Graphs I and II. A suitable catalyst for this reaction, e.g., $FeCl_3$, may further lower the temperature of this initial step. See Graphs III, IV and V, in which Graph III shows the catalytic effect of iron chloride ($FeCl_3$); Graph IV provides a side-by-side comparison of the catalytic effect of $FeCl_3$ as compared without the catalyst; and Graph V makes a similar comparison but uses a much slower heating rate, i.e. 2 C/min as shown in Graph II, versus 10° C./min.

The graphs are all generated on a TA Instruments TGA Model 2950 Hi-Resolution Thermo-Gravimetric Analyzer. They show the amount of weight loss of $VCl_3$ verses temperature. Since the decomposition of $VCl_3$ produces a weight loss the progress of the reaction may be monitored by observing weight loss. The TGA2950 samples weight twice per second. Thus the line in the graph is composed of raw data points and not calculated data. It can be seen from Graph (I) that at a 10° C./min heating rate that the $VCl_3$ starts decomposition at around 275° C. and is done by 550° C. This is in agreement with the combined consensus of the available literature. However, in Graph III and IV, note the effect on the decomposition temperature when FeCl3 is used as a catalyst. Note that the reaction starts at a lower temperature and stays ahead of its uncatalyzed counter part until the reaction material is spent at 550° C. where the lines converge. See Graph IV. Clearly, $FeCl_3$ is an effective catalyst for the decomposition of $VCl_3$. Note also in graph (II) that if the temperature ramp-up rate is lowered from the normally used 10° rate to a lower 2° rate that it can be seen more clearly that even uncatalyzed the reaction commences at 150° C. and is complete at 360° C. Further, $FeCl_3$ still evidences a positive catalytic effect even at this more accurate rate of increase of the temperature. Thus, it has been discovered that $VCl_3$ can be decomposed in the 300°-400° C. temperature range, which is over 100° C. lower than the known teaching of the prior art.

In a second step, halogen gas, i.e. the chlorine gas from the first reaction is reacted with steam to produce oxygen and HCl (sometimes called the "Reverse Deacon" reaction). In a third step, HCl is reacted with the vanadium dichloride to produce hydrogen and vanadium trichloride. The vanadium trichloride is thus ready to begin the cycle again.

In one embodiment of the V-Process, FIG. 2, the vanadium salts for both the decomposition and regeneration steps are in a dry (powder) state. This process is as follows:

| | | |
|---|---|---|
| $2\ VCl_3 = 2VCl_2 + Cl_2$ | 525° C.   delta H + 291 | (1) |
| $Cl_2 + H_2O = Co\ cat = 2\ HCl + \frac{1}{2} O_2$ | 100° C.   delta H + 13 | (2) |
| $2\ VCl_2 + 2HCl = 2\ VCl_3 + H_2$ | 300° C.   delta H + −7 | (3) |
| $H_2O + heat = H_2 + \frac{1}{2} O_2$ | (net) −287 kJ/mole | |

All temperatures reported in the equations are illustrative only, and other suitable starting temperatures are indicated in Graphs I-IV, depending on the presence or absence of a catalyst.

Another embodiment of the V-Process, FIG. 3, is referred to as the "wet process." The difference here is that the wet process releases hydrogen from an aqueous solution, thus allowing for a substantial simplification of separation requirements. It also allows the use of very low temperature heat input for a portion of the process' energy needs, thereby improving the economy of the process where such low-grade heat is available. The "wet process" is as follows:

| | | |
|---|---|---|
| $2VCl_3 = 2VCl_2 + Cl_2$ | >525° C. | delta H = +291  (4) |
| $2VCl_2 + 2HCl_{(aq)} = 2VCl_{3(aq)} + H_2$ | 30° C. | delta H = −17  (5) |
| | (dry $VCl_3$ = +33) | |
| $Cl_2 + H_2O = Co\ cat = 2HCl + ½O_2$ | 300° C. | delta H − 12  (6) |
| $\overline{H_2O + heat = H_2 + ½O_2}$ | (net) −287 kJ/mole | |

In the wet process the only extra step that is required is to dry the vanadium trichloride solution to anhydrous vanadium trichloride so that it may be recycled for decomposition. This step is done in the presence of hydrogen chloride gas, which does require the consumption of energy. However, the advantage of the wet process is that there is no need to separate hydrogen chloride from oxygen. In facilities where low grade steam (100°-200° C.) is available, as well as a higher temperature heat source, the energy balance may well tip in favor of the wet process as this heat (steam) can be used to dry the $VCl_3$ for reuse. However, if excess steam is not available, then the dry process will possibly be more efficient. An engineer designing the V-Process thus has the flexibility of utilizing a suitable amount of energy by selecting the type of V-Process (dry/wet) that is most compatible with the available energy (heat) source.

A variant of the V-Process is shown in FIG. 4 wherein another metal chloride salt is used to form a double salt. For instance, the addition of sodium chloride forms the compound $NaVCl_4$. This compound has the advantages that it decomposes without going through the intermediate of $VCl_4$, and that the decomposition temperature is narrower. The use of double salts also offers the possibility of lowering the decomposition temperature through the incorporation of less stable metal halide salts such as iron chloride. While the double salt process may be incorporated into the initial step (1) of either the wet or dry process, it still utilizes a vanadium III/vanadium II cycle. An example of the double salt reaction is as follows:

$$NaVCl_4 \rightarrow NaVCl_3 + ½Cl_2 \quad (7)$$

$$NaVCl_3 + HCl \rightarrow NaVCl_4 + ½H_2 \quad (8)$$

As it can be seen, reactions 7 and 8 can replace, e.g. reactions 1 and 2 in dry process. This sequence also eliminates any occurrence of $VCl_4$, a volatile intermediate of reaction (1).

Figure 2:
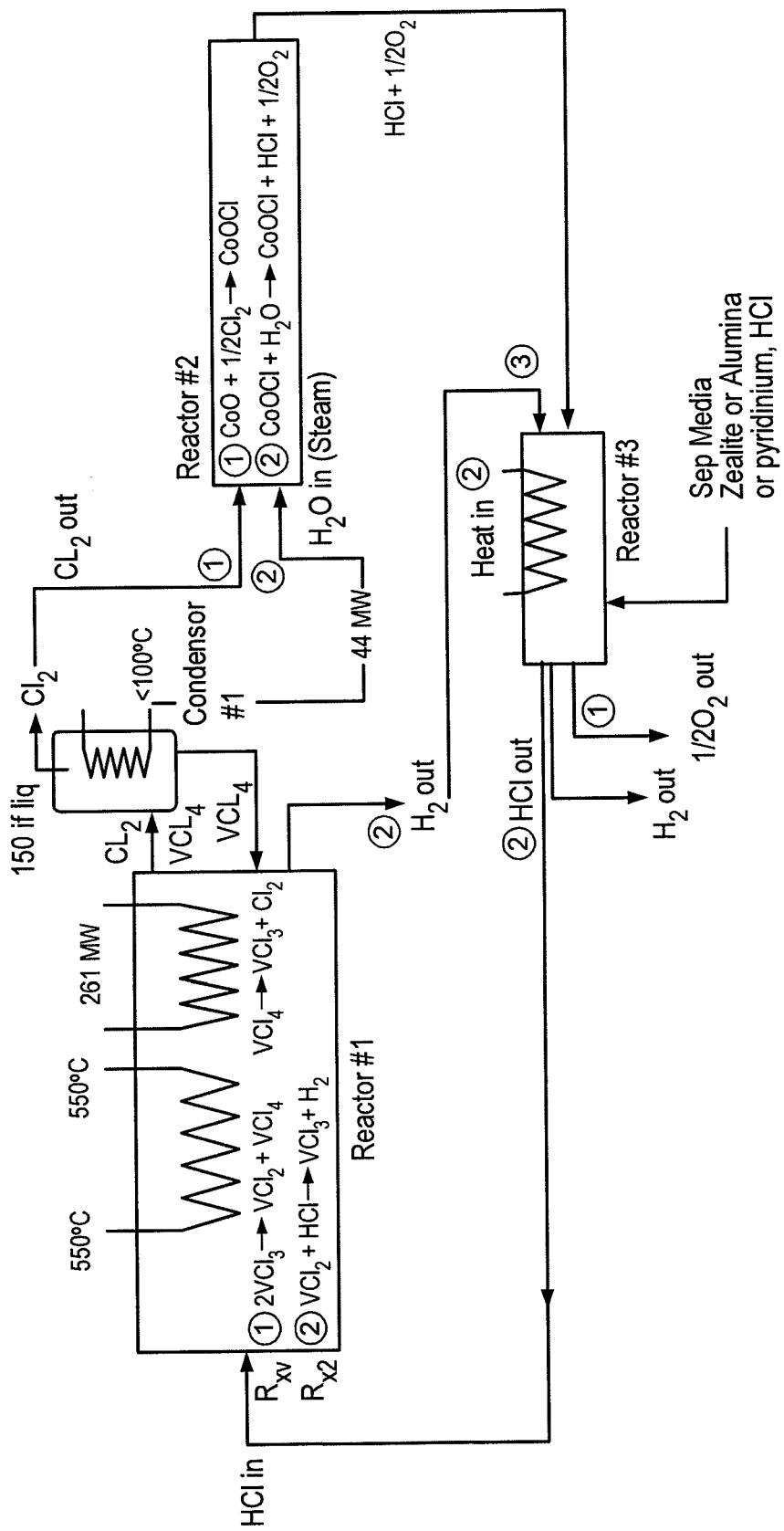
Figure 3:
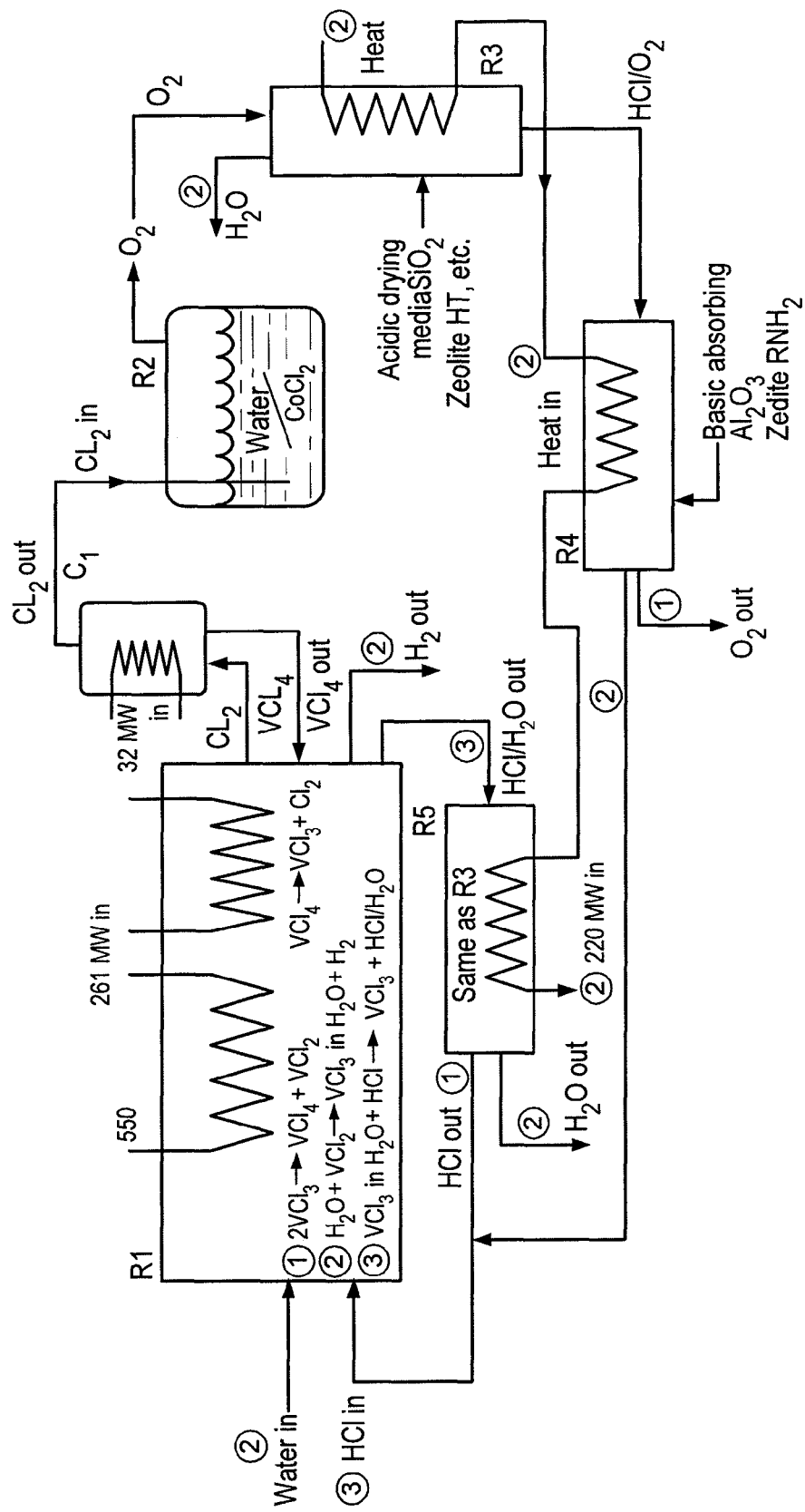
Figure 4:
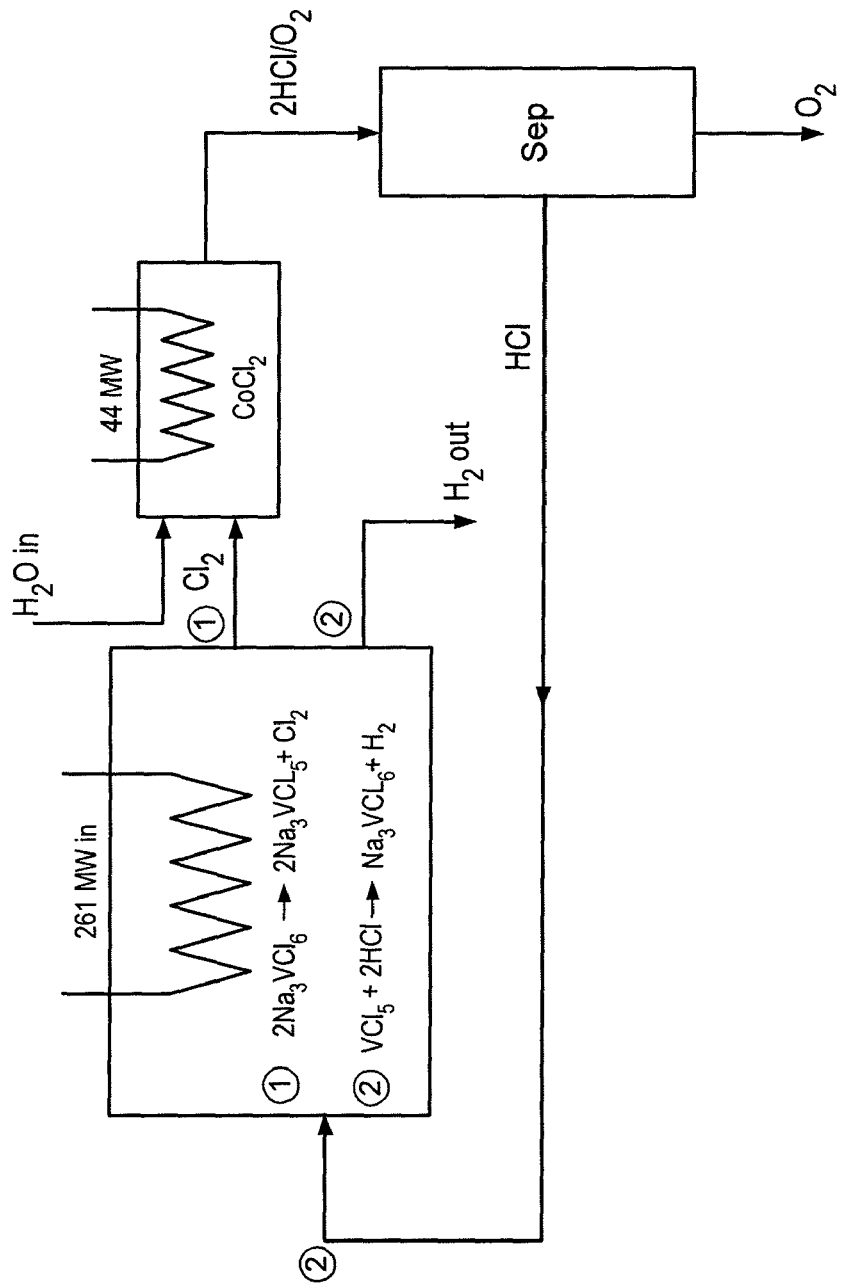

Graph I depicts a thermal decomposition curve of vanadium trichloride at a heating rate of 10° C./mm. in the absence of a catalyst;

Graph II depicts a thermal decomposition curve of vanadium trichloride at a heating rate of 2° C./mm. in the absence of a catalyst;

Graph III depicts a thermal decomposition curve of vanadium trichloride at a heating rate of 10° C./mm. in the presence of a $FeCl_3$ catalyst;

Graph IV depicts a side-by-side comparison of a thermal decomposition curve of vanadium trichloride in the absence a catalyst, and a thermal decomposition curve of vanadium trichloride in the presence of a $FeCl_3$ catalyst, respectively, each at a heating rate of 10° C./mm.;

Graph V depicts a side-by-side comparison of a thermal decomposition curve of vanadium trichloride in the absence a catalyst, and a thermal decomposition curve of vanadium trichloride in the presence of a $FeCl_3$ catalyst, respectively, each at a heating rate of 2° C./mm.;

FIG. 2 depicts a continuous process according to one embodiment of the disclosed subject matter;

FIG. 3 depicts a continuous process according to one embodiment of the disclosed subject matter;

FIG. 4 depicts a continuous process involving a double salt according to one embodiment of the disclosed subject matter; and FIG. 5 depicts a process according to one embodiment of the disclosed subject matter.

DETAILED DESCRIPTION OF THE INVENTION

A particular preferred embodiment of the V-Process begins with reduction of vanadium chloride (III) to vanadium chloride (II) by decomposition with heat. This reaction releases free chlorine gas from a first reactor, and leaves behind solid vanadium II salt. The chlorine that is liberated from the vanadium salt may contain some VCl4, which can be removed by simple condensation and returned to the beginning of the VCl3 decomposition reactor used at the beginning of the V-Process. Thereafter, the chlorine is pure and requires no further cleaning prior to going to a second reactor. A catalyst, such as $FeCl_3$, may be used in the initial reaction, the effect of which is to lower the temperature at which the $VCl_3$ is decomposed. See Graphs (III-V). Other suitable catalysts include $PbCl_4$, $SbCl_5$, $CrCl_4$, $MnCl_4$, $CoCl_3$, $K\ NiCl_4$; $NlCl_3$, and $BiCl_5$, $FeCl_3$, $CuCl_2$ and any other compounds that can reversibly absorb a halogen gas. The choice of catalyst must be consistent with the corresponding metal halide that is used in the initial reaction, e.g. $VI_3$ and $PbI_4$, or $VBr_3$ and $PbBr_4$.

The V-Process can be designed for batch-wise processing so that the vanadium salt solids stay in one reactor, while all mass transfers are carried out by gas HCl, $Cl_2$, $H_2$, $O_2$ and water vapor. The process only requires two solid bed reactors, an absorber, and a gas separation chamber. Alternatively, the process can be designed to be continuous, so the $VCl_3$ moves through one reactor decomposing to $VCl_2$ and releasing chlorine, and then through another reactor to react with the HCl to form hydrogen. The solids may be conveyed through the reactors by a screw conveyor or pneumatically by a recycle loop of the reactant gases. The conceptual, schematic process drawing in FIG. 1 shows a continuous process scheme using screw conveyors in the vanadium reactors.

Figure 1:
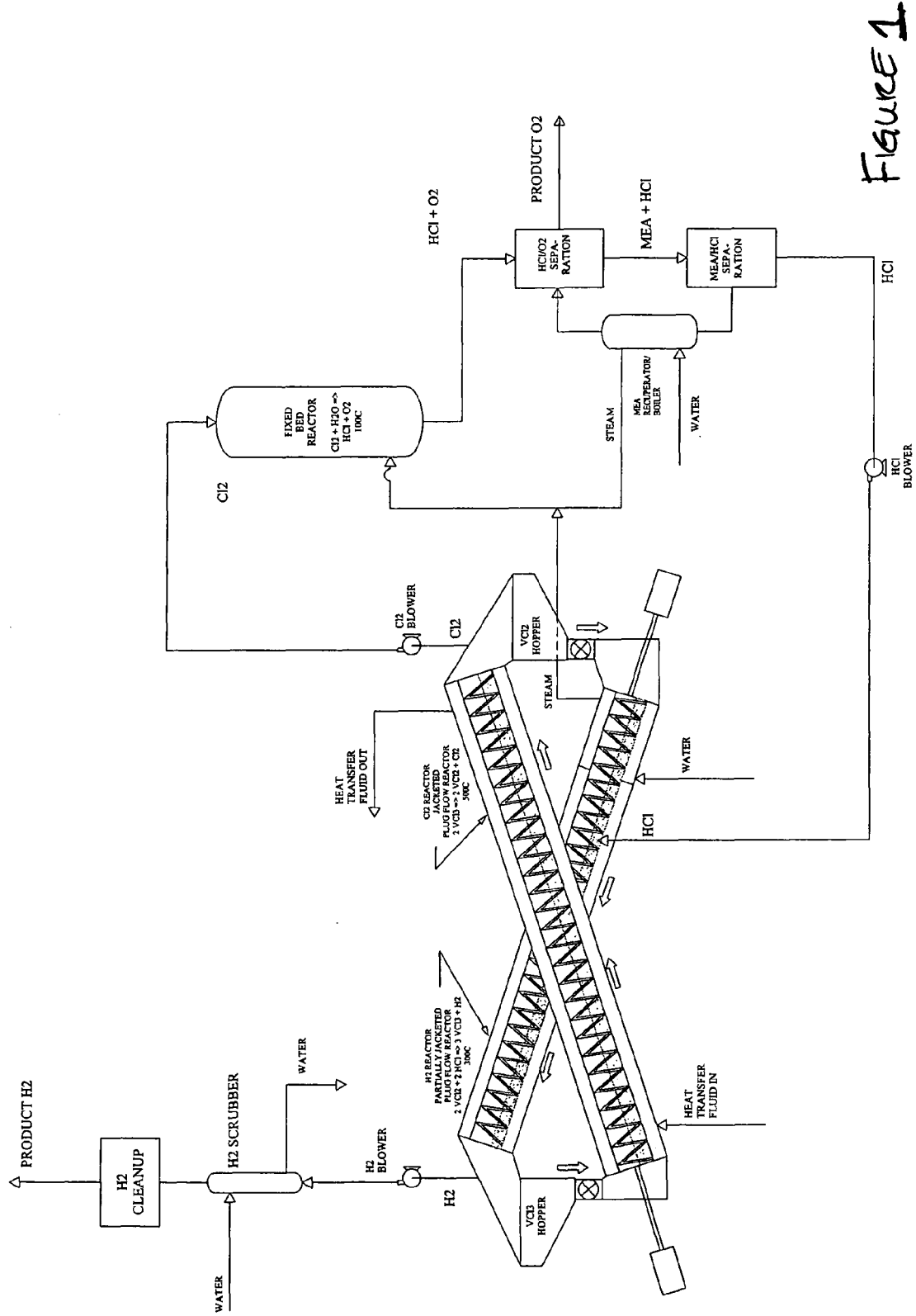
FIG. 1 depicts a continuous process according to one embodiment of the disclosed subject matter.

As shown in FIG. 1, the chlorine that is generated is sent to a second reactor where it is reacted with steam over a solid catalyst to generate HCl and $O_2$ according to reaction (2). The HCl and $O_2$ are separated from each other. The $O_2$ is a product of the process and the HCl is sent to the first reactor to complete the cycle by generating hydrogen and regenerating the vanadium chloride III salt.

The oxygen and HCl are easily separated since HCl is acidic and very water-soluble while oxygen is neither. One known industrial method that is cost effective is to use a mildly basic material that absorbs the HCl in a scrubber. The material is then sent to a second chamber where heat is applied and the HCl is recovered again as a gas and the base material reused. Compounds such as monoethanolamine, diethanolamine, triethanolamine, melamine, zeolites, charcoals, silicas, alumina, magnesia and compounds having functionality that can reversibly absorb an acid gas, such functionalities being for example $NH_3$, $NH_2$, OH, O, and C═C, for example, are suitable for this purpose. Water is also suitable, and a distillation set-up can be used to separate the two. This, however, would be more capital intensive than the simple scrubber—heater combination described above; nevertheless if low grade waste steam is available the cost of running a still may be acceptable. Again the V-Process allows the engineer many design choices.

Further, any material that will absorb acidic gases such as HCl and which can be regenerated by heat is suitable. Many polymers that have active amine groups such as Melamine or poly-vinyl-pyridine type family, etc. can be used in accordance with the general equations:

$$MEA(l) + Cl2(g) + H2O \rightarrow \text{deacon catalysts} \rightarrow MEA*HCl(s) + O2(g) \quad (9)$$

$$MEA*HCl(s) \rightarrow 200°\text{ C.} \rightarrow MEA(l) + HCl(gas); \text{ or} \quad (10)$$

$$Melamine(s) + Cl2(g) + H2O \rightarrow \text{deacon catalysts} \rightarrow Melamine*HCl(s) + O2(g) \quad (11)$$

$$Melamine*HCl \rightarrow 200°\text{ C.} \rightarrow Melamine(s) + HCl(g) \quad (12)$$

The materials should be chosen for their ability to absorb acid gases, e.g. HCl and release it at moderate temperatures, as well as having a resistance to chlorine. The chosen material may either reside in the deacon reactor or just adjacent to it to shift the equilibrium to the production of oxygen.

In a second reactor, as the chlorine reacts with water vapor, the HCl and oxygen form. It is important and therefore preferred to run the reaction in the presence of an acid absorbing material that can be regenerated later. This shifts the equilibrium fully to the production of oxygen. The acid absorbing material is regenerated by heat in a separate reactor. The use of an HCl absorber is essential to operating the Reverse Deacon reaction at a low temperature, and thereby enabling the entire process to be operated using available and suitable heat sources which are generally at or below 600° C. If there is any residual chlorine (which can be monitored by a chlorine sensor), it can be either absorbed by water if that is the HCl separation medium, or it can be passed over a much smaller second bed of vanadium chloride II salt. At low temperatures (100° C.), $Cl_2$ will oxidize the vanadium chloride II back to vanadium chloride III, and the HCl will not react with the vanadium chloride II. This bed can then be periodically regenerated by heating it up to 500° C. to regenerate and recover the $Cl_2$ and the $VCl_2$. Other suitable methods will be apparent to the skilled practitioner and may be employed as well. While such a cleaning step may not be necessary, it does allow for greater design flexibility by putting a lower burden on the catalyst operation if needed.

As the HCl is sent back to the first reactor it will generate hydrogen gas. Since hydrogen and chlorine react violently, prior to introduction of HCl, the first reactor will have any remaining traces of chlorine removed either by a vacuum pump or by flushing with the inert gas. Thus only hydrogen should be present in the out-going gases. At the beginning of the reaction in batch-wise processing, with a large excess of $VCl_2$ available, the hydrogen coming out the reactor (column) should be quite pure. An HCl gas monitor can be placed at or near the output of the column to detect unacceptable HCl levels, and at which point the HCl flow would be stopped, the reactor evacuated, and the heat reapplied to regenerate the $VCl_3$. It is not necessary to react all the $VCl_2$ since chlorine generation can be monitored during the heating to ensure that extra energy is not wasted. If desired, the hydrogen product can also be scrubbed with water or monoethanolamine as described above for oxygen cleaning.

Finally, the process can be made continuous by having two reactors with one taking in heat and generating chlorine and the other taking in HCl and making hydrogen. This provides a constant flow of gases to the reactor and has various processing advantages. See FIG. 1.

A substantial advantage gained with the V-Process is the avoidance of the capital costs required to build a plant with exotic alloys, i.e. costs which mushroom in both material costs and the specialty fabrications required to work with such materials. By operating at a temperature at or substantially below about 600° C., an important advantage is realized, since the industry already has economical solutions for handling chlorine and HCl under these rather typical conditions. Thus, no new engineering or testing is required, and the specification of materials known to be acceptable over long time periods for commercial plants are already well known. Thus, the V-Process allows for realistic cost assessments for plant construction, and corresponding realistic revenue and profit projections, which are essential for any serious commercial venture.

The V-Process is designed to use the least expensive materials available. There is substantially no loss of the starting materials in the process. The solids are, for example, vanadium salts that cost about $3-4 per pound of contained vanadium. Since vanadium has an atomic weight of 51 and iodine has an atomic weight of 131, for the same amount of hydrogen produced almost 3 times more iodine is required. Iodine costs more than 4 times the cost of vanadium, so that the initial capital cost of chemicals for the prior art I—S process is over 10 times those required for the V-Process.

Another advantage that the V-Process has is that unlike the I—S process the efficiency is not strongly dependent on the input temperature. In order even to get to the 40% conversion efficiency with I—S, the temperatures must be well over 850° C. The high temperature reaction, namely the decomposition of sulfuric acid at over 850° C., leads to corrosion of the plant materials. Further, iodine is expensive and losses are a serious problem, and the separation steps are not well defined and difficult. While the I—S process has been known for over 30 years, it has never been practically implemented. The same is true for other high temperature cycles that have been considered.

In the "reverse deacon" step of the V-Process, a catalyst is primarily copper and cobalt chlorides on an alumina substrate is used. These catalysts are inexpensive and active materials which are readily available commercially. Other suitable catalysts include any material that can reversibly accept and give up chlorine. However, in the present invention, the uptake of HCl drives the reverse deacon reaction.

Monoethanolamine is also a well-known, inexpensive chemical that is already cyclically used to remove acidic contaminants from natural gas. Polymers that have an active amine group such as melamine, polyvinyl-pyridine, etc. can also be effectively used, as well as many other amines or compounds that form HCl salts. Thus the scrubbing and handling technology is already known and available and practiced economically on a very large scale.

The V-Process uses three simple steps that are easily scaled-up to a working plant. This gives a very high level of confidence in the finished process. While there seems to be no impediments to the integration of these steps (separations and other details for this are discussed above) readily available data will aid in optimizing the process, e.g., matching reaction rates and energy inputs. It has been found that the initial reaction of V-Process, even without a catalyst, may be initiated at a temperature of below 400° C. See Graphs I and II.

The benefits of using vanadium chloride double salts in the reaction cycle have been discussed above; however, very little data are available on equilibria in these multicomponent systems at anticipated processing cycle temperatures. In determining thermochemical quantities (e.g., reaction enthalpy) and kinetic properties for both the hydrogen production and chlorine production steps of the process cycle, it is believed that for at least two double salts with the general formulae $M_3VCl_6$ and $M_3VCl_5$, where M is an alkali metal ion (e.g., Na or K), the primary reactions replacing reactions 1 and 3 in the basic cycle are as follows:

$$2M_3VCl_6 = 2M_3VCl_5 + Cl_2 \quad (13)$$

$$2M_3VCl_5 = 2HCl = 2M_3VCl_6 + H_2 \quad (14)$$

The preparations of double salts, e.g. using vanadium trichloride have been based on fusion of the dry salts (Grena, 1960; Vasilkova and Perfilova, 1965). The sodium and potassium double salts are prepared by fusing stoichiometric mixtures of MCl and $VCl_3$ according to the literature. These materials are fully characterized by X-ray diffraction and elemental analysis prior to beginning the reaction studies. In order to prepare mixed salts under more moderate conditions, and potentially in larger quantities, the precipitation of the double salts are obtained from solution. Hydrolysis of $VCl_3$ is potentially extensive in aqueous solution, and use of less-hydrolytic solvents (e.g., alcohols) and strongly acidic solution conditions in making larger samples of the chloride salts are possible.

The design of a practical cyclical process for hydrogen production from the thermochemical vanadium cycle utilizes data on the extent and rate of the individual reactions of the cycle. The enthalpies of formation of the compounds $Na_3VCl_6$ and $K_3VCl_6$ from MCl and $VCl_3$ have been reported as −25.52 and −60.2 kJ/mol at 298 K, respectively (Vasilkova and Perfilova, 1965). While phase-equilibrium data are available for the ternary system incorporating divalent vanadium chloride (i.e., NaCl—$KVCl_3$—KCl), thermochemical data for possible double salts (such as $KVCl_5$) in the divalent system need to be calculated to provide the extent of reaction (free energy change) for the chlorine-production reaction for the hydrogen-production reaction.

The stoichiometric compounds $M_3VCl_5$ are believed to be stable compared to the known coordination compound $MVCl_3$ in solid solution with MCl. However, since previous studies have focused primarily on phase equilibria, no kinetic data are presently known that permit estimation of the rates of either reaction. Nevertheless, there are indications in the literature of instability and/or volatility of some components that may potentially restrict the operating range of a practical cycle. For example, one reference (Orekhova et al., 1974) suggests that $KVCl_3$ may be volatile at high temperatures, and there are indications (Shchukarev and Perfilova, 1963) that the sodium compound $Na_3VCl_6$ melts incongruently (i.e., decomposes) at 555° C., near the anticipated optimum temperature for the chlorine-production reaction.

Use of a high-temperature flow calorimeter system (Busey et al., 1984) determines simultaneously the rates and thermochemistry of the chlorine and hydrogen-production reactions. In the simplest test for chlorine production, the temperature of the calorimeter is raised until both the calorimeter signal (heat flux) and offgas production indicate the onset of chlorine production. Capturing the offgas stream for subsequent analysis indicates the approximate rate and extent of $Cl_2$ production as a function of the temperature; and full analysis of the offgas stream indicates whether additional volatile products are produced in the reaction. This mode of operation is particularly effective for screening compounds and for establishing temperature ranges for further detailed analysis.

Once the screening studies have been completed for the chlorine-production reaction, detailed information on the rate and extent of this reaction is obtained from steady-state experiments. At a constant temperature, a constant flow of an inert carrier gas (e.g., $N_2$) is established through the sample. The calorimetric signal indicates the enthalpy of the chlorine-production reaction, and either on-line (gas-chromatographic) or batch analysis of the offgas stream is used to determine the rate of the reaction. This mode is particularly effective for relatively slow reactions; carrying out these tests over a range of temperatures establishes optimum kinetic and equilibrium conditions for cycle operation. Once the reaction has been completed at a particular temperature, as indicated by the disappearance of the thermochemical signature of the reaction, the system will be sealed and cooled, and the sample removed for analysis to determine the oxidation state of vanadium and the state (i.e., crystalline, sintered, or amorphous) of the product solid.

The hydrogen-production reaction inherently involves both reactant and product gas streams. For this reaction the chlorine-depleted solid phase, contained at constant temperatures within the calorimeter working call, is exposed to flowing HCl in a carrier gas stream. This gas stream is humidified at varying levels to test the optimum hydrogen-production reaction. The production of hydrogen is indicated both by analysis of the product gas steam and by the measured heat flux arising from the enthalpy of the reaction. However, humidification must be limited so as not to produce any ox halides of vanadium such as VOCl. Limiting moisture and keeping the HCl concentration sufficiently high is required to accomplish this.

The determination of the steady-state enthalpy of this process, combined with knowledge of the rate of reaction from the offgas analysis, enables one to calculate the enthalpy of formation of the vanadium trichloride double salts from MCl and the divalent vanadium chloride. Similarly by obtaining data on the rate of reaction as a function of reactant (HCl) and promoter ($H_2$) concentrations, total gas pressure, and temperature one is enabled to optimize the process conditions for the hydrogen-production reaction.

Temperatures required by the V-Process make integration into current solar power tower plant designs quite practical. As explained above, operation with solar trough concentrators may also be possible and practical.

There is great current interest in utilizing coal as a fuel in a clean and efficient manner. There is also a great and rising demand for natural gas that is being met by imports, thus increasing the dependency of the U.S. on foreign sources of energy. The following discloses a preferred application of the V-Process, wherein it is integrated into an integrated gas combination cycle (IGCC).

The steps used in coal gasification produce large quantities of gases in the temperature range of 600° to 800° C. or greater. The common practice is to use these gases to make steam, if it is needed. However, due to thermodynamic limitations, it turns out that it is better to use the steam in a non-carnot limited chemical process rather than a carnot limited mechanical process.

The V-Process decomposes water into hydrogen and oxygen with heat input at the relatively low temperature of about 500° C. This low temperature is critical to the successful integration of the V-Process into an IGCC process.

The first step in an IGCC process is typically to react a carbon containing source with a certain amount of oxygen and steam at least 700° C. or greater. The oxygen is usually pure, but air may also be used. There are two basic reactions taking place in this gasifier.

The first is the reaction of the carbon components with steam; and the second is the reaction of carbon components with oxygen, when there is always a deficit of oxygen so that little if any carbon dioxide is produced. Nevertheless, carbon monoxide and hydrogen are the desired products as follows.

$$C+H_2O \rightarrow CO+H_2 \quad DG=+32 \text{ KCAL/MOLE} \tag{15}$$

$$C+\tfrac{1}{2}O_2 \rightarrow CO \quad DG=-26 \text{ KCAL/MOLE} \tag{16}$$

Notice that reaction 15 is endothermic and thus requires the input of energy and reaction 16 is exothermic and produces energy. Thus it is the goal of the process to balance these two equations so that the net heat produced is enough to maintain the reaction and production of CO and $H_2$. Depending on the content of the feedstock and the other elements present such as bound hydrogen etc. The ratio of the amount of water to oxygen admitted may vary. Regardless, the temperature of this reactor usually needs to be maintained at least at 700° C. for the reaction to proceed at a reasonable rate. Typically, the gas generated is sent to a gas turbine to be burned to produce electricity. The solids that would normally have to be dealt with in an ordinary boiler, in a baghouse, are instead removed from the gasifier and disposed of.

The exhaust of the turbine is still at over 500° C. In an IGCC Process, this heat is used to make steam to run a steam turbine to make additional electricity. While this step does increase the overall efficiency of the recovery, it is an expensive step relative to using that same heat to make hydrogen and oxygen for use in the IGCC Process and thereby increasing the efficiency without having to use a steam turbine at all. With 500° C. steam the steam turbine will only operate at about 18% efficiency. This number was not attractive when energy was cheap. Now that energy is not cheap that number seems more acceptable. However, there are more economical ways to handle that energy. By using that energy to split water, both hydrogen and oxygen are produced. The gasifier requires oxygen to produce a purer higher quality fuel for the turbine. An air separation plant normally supplies this oxygen. This plant adds to both the capital costs and the energy consumption of the system. However, oxygen from the V-Process eliminates this cost and energy drain.

The hydrogen can be either used as a fuel or used as a feedstock to make methane. If the hydrogen is used as a fuel it is simply added to the gas feed of the gas turbine. These turbines have modified burners to handle hydrogen as a fuel. The burners should be such that they will run properly on the hydrogen-fuel mixture. Since this fuel is used in place of the raw gasifier fuel, the output of the turbine will be the same for less fuel consumption, thus increasing the effective efficiency of the system. Since the V-Process is over 70% efficient, and the gas turbine is about 32% efficient, the net increase in output is over 22% with far less capital expenditure.

The hydrogen may also be used to make methane through a simple methanation process with the carbon monoxide as follows:

$$CO+3H_2 \rightarrow CH_4+H_2O \quad DG=-12 \text{ KCAL/MOLE} \tag{17}$$

Reaction 17 is exothermic, and runs at about 650° C., and thus this heat may also be recovered to be used in the V-Process.

Different gasifiers and different feeds result in different amounts of CO and $H_2$. However, based on known gasifier technologies, and regardless of whether the reactor is fluid bed, moving bed, or entrained flow, the hydrogen content tends to be around 14 to 28 (mole) %. The CO content ranges from about 23% to 40%; the $CO_2$ content ranges from about 6 to 12% and the water is about 6 to 23%. There are also small amounts of methane produced (typically under 1%). If air is an oxidant the above numbers are about half of the stated values, since nitrogen makes-up about 50% of the output gas.

According to equation 17 the optimal mix to make methane (based on a mole ratio of (CO:H) is 3:1. Gasifiers running on coal require additional hydrogen to make methane. Real world fuels such as coal and oil contain anywhere from 6% to 14% hydrogen bound in C—H bonds. Thus when these bonds break additional hydrogen is released as shown in reaction 17 and 19 below:

$$(CH_2)_X+O_2 \rightarrow XCO+XH_2; \text{ and} \tag{18}$$

$$(CH_2)_X+XH_2O \rightarrow XCO+XH_2. \tag{19}$$

Again, similar to reactions 15 & 16 above, reaction 18 which uses oxygen is exothermic and reaction 19 which uses water is endothermic.

Since $CO_2$ is also a by-product it can be assumed that some of the reactions also produce $CO_2$. The most likely is the shift reaction as follows:

$$CO+H_2O \rightarrow CO_2+H_2. \tag{20}$$

Reaction 20 is slightly exothermic under the conditions in the reactor. Also of course some CO can be lost to the more parasitic reaction with oxygen as follows:

$$CO+\tfrac{1}{2}O_2 \rightarrow CO_2. \tag{21}$$

Reaction 21 is very exothermic. However, under the conditions in the reactor the following reaction is also favored:

$$CO_2+C \rightarrow 2CO. \tag{22}$$

As can be seen, the complexity of the real reaction system means that the net reaction can only be determined by comparing the reactants in, with the products out, including the energy balance.

However reaction 20 (the shift reaction) can be seen as the reaction that may be eliminated in this system since the CO is needed, and the $H_2$ will come from the V-Process. However, some shifting usually occurs in any gasifier thus accounting for the $CO_2$ in the output gases. However, depending on the energy and hydrogen balance some $CO_2$ may be methanated as well.

IGCC technology is clean. It also converts about 41% of the energy in the fuel to electricity. But it does this at a cost of over $2,000/kilowatt of electric output. This is almost double the cost of a steam plant, and triple the cost of a gas turbine plant. Further, the gas turbines need to be modified to run on fast burning gases.

An embodiment of the V-Process application will improve this system is to perform a methanation of the gas stream prior to feeding it to the gas turbines to upgrade it. Thus if the stream containing excess CO is passed over a standard methanation catalyst system, the stream coming out will contain almost no CO and be composed mostly of methane and hydrogen. There would also be water vapor that could be removed if desired prior to going to the turbine.

However, the hydrogen component of the steam which has two qualities that are not desired in the gas turbine. The first is that hydrogen lowers the volumetric energy density of the fuel; and the second is that hydrogen increases the flame speed beyond that which is desired. By eliminating the hydrogen in the fuel, the turbine can burn the fuel using regular combustion chambers thus lowering the capital costs. The one drawback to this method is that the methane/CO mixture will have less energy (by 12 kcal) when burnt as a fuel than the CO/H mixture from which it was made. However, if the mixture is kept hot out of the methanation reactor and fed to the turbine hot the released 12 kcals should be recovered in the turbine.

If purification and removal of CO is required any where in the process there are many selective methods for doing so.

One would be to absorb the CO on a reversible material that can pi-bond to the excess electron pair on the CO. Thus materials such as iron salts or metallic nickel (the Mond process) or metal carbonyls, or complex forming salts such as iron nitrosyl carbonyl can be used as follows:

$$Ni(solid)+4CO(gas) \rightarrow Ni(CO)_4 (BP4OC) \qquad (23)$$

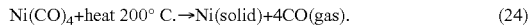

$$Ni(CO)_4 + heat\ 200°\ C. \rightarrow Ni(solid)+4CO(gas). \qquad (24)$$

The 200° C. heat required to release the CO is freely available as waste heat in the process. Another route is to pass the synthesis gas through a hydrogen separation device. These devices allow part or most of the hydrogen to diffuse through a membrane leaving the fuel mostly CO.

Thus a system where excess coal is available can be constructed. A gasifier can be made to produce enough CO and $H_2$ for both the production of electricity and the production of natural gas. The ratio of carbon oxygen and water can be varied to produce the proper ratio of CO to H to give the proper ratio desired for the production of methane and any leftovers to burn in a gas turbine.

According to FIG. 5, coal is fed into the gasifier (I) with water and oxygen from the V-Process (II). The gases from the gasifier are freed of particulate and sulfur compounds (III); the synthesis gas is split in any desired portion between the methanator (IV) and the gas turbine (V). The heat from the gas turbine is supplied to the V-Process (II). Hydrogen from the V-Process is fed to either the turbine or methane reactor as needed along line A. This may also serve to remove any excess hydrogen or CO from the methanator to be delivered to the gas turbine. Other possible applications of the V-Process are discussed below.

There are now thousands of large gas turbines that operate using natural gas, and that generate electricity. Their efficiency is generally about 33%; therefore to generate 1 Mwh of electricity it requires the burning of 3 Mwh of gas. The remaining 2 Mwh is waste heat. Most of this heat is either not used at all, or used unprofitably. With the V-Process half of this or 1 Mwh may be recovered as hydrogen gas, which may either be burned in the turbines (least profitable use) to increase the efficiency to almost 50%; or the hydrogen and oxygen may be sold. The sale of 25 Kg of $H_2$ and 200 Kg of $O_2$ would be worth at least another $40 for each Mwh produced. The electricity if sold to the local utility would typically yield an average of about $35/Mwh, of which typically less than half would be profit, or about $15/Mwh. Therefore, incorporating the V-Process with a gas turbine would increase the profitability of the operation by over 200%. In this application, the V-Process would be in the form of an add-on module.

Natural gas is now selling at over $5/MMBtu and is slated to do so for the balance of the decade. (Quotes from the NYMEX May 31, 2004). Government policies have encouraged many large energy users to decide to consume natural gas. For many years it was below $3. However, the very success of natural gas has started to cause a large rise in its price. While there are methods that can generate natural gas from coal, they tended not to be very competitive at $2-3/MMBtu, and they are also not particularly energy efficient. Large expenditures are required for oxygen plants so that the methane would not have to be upgraded prior to sale in these older processes. Since the V-Process generates oxygen as well as hydrogen this expense, in both capital and energy is eliminated. Thereby increasing the efficiency of the process while decreasing capital costs. With coal costs at about $1/MMBtu there is now a substantial profit incentive to build a natural gas plant at a coal mine which would be connected to a pipeline grid. This would eliminate the expense and energy of hauling coal long distances.

In many oil refineries the crude oils that are process do not have sufficient hydrogen, and therefore, refineries are often net consumers of hydrogen. This market has grown such that merchant hydrogen companies have built hydrogen plants in areas such as Houston, Tex. where there are enough refineries to set up a small hydrogen pipeline to service them.

However, refiners could reduce the cost of hydrogen even further by using the V-Process in-house to utilize the many waste heat sources at the refinery for producing hydrogen gas that would be used in the refinery. Depending on the refinery and the feedstocks, it is possible that some or all of the hydrogen needs may be met using the V-Process, with even some excess hydrogen to sell. Where refineries are remote and merchant hydrogen is more expensive, the V-Process will save even more money for the refiner. These cost savings are estimated to be around sixty cents to about a dollar per barrel of refined oil. With the average crack margin being about $3-$5 this could be a significant improvement in the refining margin. The process also increases the energy efficiency of the refinery and therefore makes it more environmentally friendly. Further, all of the current merchant hydrogen comes from steam reformation of natural gas. The high gas prices mentioned earlier will cause the price of hydrogen to spiral upwards in time. It can be anticipated that in a relative short period of time, nearly one-half of the refiner's margin will be saved by utilizing the V-Process as compared to the continuing to use hydrogen from natural gas.

The least expensive operationally and environmentally friendly way to generate hydrogen is using solar generation processes in which there is no fuel consumption. Solar energy is collected with large mirrors or holographic optical components. These components are less expensive than the photovoltaic cells that generate electricity at about 14% efficiency. Optical components concentrate sunlight up to about 500° C. at over 80% efficiency. This energy when utilized in the V-Process at 60% efficiency produces large quantities of hydrogen gas with low capital costs at 48% efficiency. If the electricity produced by the photocell were used to electrolyze water, only 12% efficacy would be realized. For a solar farm of similar size, the V-Process not only produces four times the hydrogen gas, but the capital cost of the solar farm is one 1/10 of the cost associated with the photovoltaic method.

At these prices and efficiencies the capital cost is about 70 cents per kilowatt which when amortized over 30 years (assuming 2,880 useable hours of sun per year) results in a cost of less than 1 cent per kilogram of hydrogen. Since the energy is free, and nine kilograms of water (a bit over 2 gallons) costs less than a penny, the overall cost for the hydrogen will be pennies per kilogram, while its value will be about a dollar per kilogram.

The V-Process may be installed wherever hydrogen is needed. Further, large solar farms are now an economic reality and can generate a significant portion of the energy requirements of the country. Desert land or any other place with a large solar resource can be expected to generate more than $20,000 per acre per year of hydrogen if the V-Process is utilized. This is far more income than could be generated by using the land for agricultural purposes.

As a direct outgrowth of the present invention, it has been recognized that hydrogen chloride is a by-product of many chemical processes. Such processes include the chlorination of many organic compounds that provide us many useful polymers. Such processes have the general reaction $RH+Cl_2$. As can be seen, half the chlorine value is lost in the HCl. It would be economically and environmentally very favorable to recover this chlorine in the HCl for reuse, and thus increase the chlorine utilization by a factor of two. The energy generation of chlorine from salt is an energy intensive process. While in the V-Process the HCl is used to recycle $VCl_2$ to $VCl_3$, there is often no use for the hydrogen chloride by-product. Further, the chlorine value in the hydrogen chloride often represents one-half of the chlorine used, and thus would be of value if it could be recovered in the form of chlorine for reuse on-site. This would also be true in the case of other halogen gases such as bromine and iodine derived from splitting HBr and HI, respectively.

Two known methods for splitting HCl are the so-called "Deacon Process" and electrolysis. Electrolysis simply dissolves the HCl in water and recovers chlorine at an anode and hydrogen at a cathode as follows:

$$HCl + e- \rightarrow \tfrac{1}{2}H_2 + \tfrac{1}{2}Cl_2. \tag{25}$$

The process is costly from both a capital and operational point of view and is not practiced.

The Deacon Process oxidizes HCl with air and is as follows:

$$2HCl + \tfrac{1}{2}O_2 \rightarrow catalyst \rightarrow Cl_2 + H_2O \tag{26}$$

While this process is practiced, wet $Cl_2$ is quite corrosive and adds to maintenance costs. Another problem is that hydrogen is not recovered and many sites could use the hydrogen. Again the Deacon Process is an equilibrium process and is thus not widely used.

What is disclosed hereinbelow is a novel process that uses the decomposition of a metal halide which must be able to be decomposed and give off a halogen gas at a reasonable temperature. The initial step of the V-Process is one example. The metal of the remaining lower valence metal halide (or metal) must then be able to react with HCl to give off hydrogen and regenerate the original compound. Again, the third step of the V-Process is one example. Accordingly, a generic formula is as follows:

$$MCl_x \rightarrow heat \rightarrow MCl_y + (x-y)/2\, Cl\ (where\ x>y) \tag{27}$$

$$MCl_y + (x-y)HCl \rightarrow heat \rightarrow MCl_x + (x-y)/2 H_2;\ and \tag{28}$$

Results in a net equation as shown in reaction (29) below:

$$HCl + heat \rightarrow \tfrac{1}{2}H_2 + \tfrac{1}{2}Cl_2. \tag{29}$$

$$FeCl_3 \rightarrow heat > 285°\ C. \rightarrow FeCl_2 + \tfrac{1}{2}Cl_2 \tag{30}$$

$$FeCl_2 + HCl \rightarrow heat \rightarrow FeCl_3 + \tfrac{1}{2}H_2. \tag{31}$$

Note that reactions (30) and (31) above net out to the same as reaction (29).

$$VCl_3 \rightarrow heat\ 500°\ C. \rightarrow VCl_2 + \tfrac{1}{2}Cl_2 \tag{32}$$

$$VCl_2 + HCl \rightarrow heat \rightarrow VCl_3 + \tfrac{1}{2}H_2. \tag{33}$$

Again, reactions (32) and (33) net out to reaction (29). However, reaction (32) proceeds through an intermediate of $VCl_4$. To prevent this, double salts may be used such as below:

$$NaVCl_4 \rightarrow NaVCl_3 + \tfrac{1}{2}Cl_2 \tag{34}$$

$$NaVCl_3 + HCl \rightarrow NaVCl_4 + \tfrac{1}{2}H_2. \tag{35}$$

Further, catalysts that help the release of chlorine may also be useful. For instance $FeCl_3$ does catalyze the decomposition of $VCl_4$, thus $FeCl_3 \rightarrow FeCl_2 + \tfrac{1}{2}Cl_2$ at only 285° C. $\tag{36}$ But reaction (33) takes place instantly. $FeCl_2 + VCl_4 \rightarrow FeCl_3 + VCl_3.$ $\tag{37}$ Thus, the net reaction (34) below takes place more rapidly at 285° C. than would pure $VCl_4$. $VCl_4 \rightarrow VCl_3 + \tfrac{1}{2}Cl_2$ is faster at 285° C. with $FeCl_x$ than without. $\tag{38}$ Other materials that decompose to chlorine can also be used such as $PCl_5 \rightarrow PCl_3 + Cl_2$. $\tag{39}$ In general the higher oxidation states of elements with more than one common oxidation state will tend to give off chlorine when heated and be suitable as a catalyst or the main material in this process. Other examples of this are as follows:

$$PbCl_4 \rightarrow PbCl_2 + Cl_2 \tag{40}$$

$$SbCl_5 \rightarrow SbCl_3 + Cl_2 \tag{41}$$

$$CrCl_4 \rightarrow CrCl_3 + \tfrac{1}{2}Cl_2 \tag{42}$$

$$MnCl_4 \rightarrow MnCl_2 + Cl_2 \tag{43}$$

$$CoCl_3 \rightarrow CoCl_2 + \tfrac{1}{2}Cl_2 \tag{44}$$

$$KNiCl_4 \rightarrow KNiCl_3 + \tfrac{1}{2}Cl_2 \tag{45}$$

$$NiCl_3 \rightarrow NiCl_2 + \tfrac{1}{2}Cl_2 \tag{46}$$

$$BiCl_5 \rightarrow BiCl_3 + \tfrac{1}{2}Cl_2 \tag{47}$$

Many other combinations will be obvious to those skilled in the art. The most useful compounds will be those such that the lower valence state is of sufficient reducing power to reduce hydrogen from HCl. These lower valence compounds are $V_{2+}$, $Cr_{2+}$, $Fe_{2+}$, $P_{3+}$, etc.

A facility that generates hydrogen chloride may easily use waste heat or intentionally generate the heat to recover both hydrogen and chlorine values from hydrogen chloride. Such a process will reduce the chlorine consumption in half, save energy and eliminate a waste stream. Many variations of the foregoing invention will be apparent to those skilled in the art, accordingly, the teachings of the present invention is not to be understood as limited to the specific processes and formulae, equations, temperatures, materials disclosed herein, which are primarily advanced by way of example.

I claim:

1. A process for producing hydrogen comprising reacting a suitable metal halide compound MX using heat so as to reduce compound MX from an initial valence state to a lower valence state; wherein a gas is formed, thereafter, the gas is reacted with water in the presence of an acid-absorbing material to form oxygen and an acidic compound, the acid compound being formed by an acid and the acid absorbing material; separating the oxygen; separating the oxygen; separating the acid from the acid-absorbing material; and reacting the acid and the reduced metal halide to produce hydrogen and the compound MX, wherein MX is a double salt of vanadium trichloride.

2. The process according to claim 1 wherein a first portion of the second salt forming the double salt is selected from the group consisting of sodium, potassium, chromium, niobium, titanium, molybdenum, manganese, iron; and wherein a second portion of the second salt forming the double salt is the same as X.

3. The process according to claim 1 wherein the double salt is reacted in the presence of a catalyst.

4. The process according to claim 3 wherein the catalyst is selected from the group consisting of $PbCl_4$, $SbCl_5$, $CrCl_4$, $MnCl_4$, $CoCl_3$, $KNiCl_4$, $NiCl_3$, $BiCl_5$, $FeCl_3$, and $CuCl_2$.

5. The process according to claim 1 operated as a batch process.

6. The process according to claim 1 operated as a continuous process.

7. The process according to claim 1 wherein the reaction temperature used in all the reactions is at a temperature equal to or lower than used in reducing the metal halide compound MX to a lower valence state.

8. The process according to claim 7 wherein the reaction temperature used in all the reactions is about 600° C. and below.

9. The process according to claim 7 wherein the reaction temperature used in reducing the metal halide compound MX to a lower valence state is about 400° C. and below.

10. The process according to claim 1, wherein the acid-absorbing material is capable of being regenerated by heat.

11. The process according to claim 10 wherein the acid-absorbing material is selected from the group consisting of a polymer having an active amine group, amines, and compounds that form a hydrogen halide salt.

12. The process according to claim 10 wherein the acid-absorbing material is selected from the group consisting of monoethanolamine, diethanolamne, triethonolamine, melamine, zeolites, charcoals, silicas, alumina, magnesia and compounds that have any functionality that can reversibly absorb acid gas.

13. The process according to claim 1, wherein a catalyst is used in reacting the gas with water and acid-absorbing material.

14. The process according to claim 13 wherein the catalyst is selected from the group consisting of a cobalt catalyst and a copper catalyst.

15. A process for producing hydrogen comprising reacting vanadium tricholoride with $FeCl_3$ as a catalyst using heat having a temperature of about 600° C. or below to effect the reduction of vanadium trichloride to vanadium dichloride and chlorine gas; thereafter reacting the chlorine gas with steam and melamine in the presence of a cobalt catalyst using heat having a temperature of about 600° C. or below to produce a melamine-hydrogen chloride compound and oxygen; thereafter separating the oxygen from the melamine-hydrogen chloride compound; thereafter the melamine-hydrogen chloride compound is heated to a temperature of about 600° C. or below to separate hydrogen chloride and the melamine; and reacting the hydrogen chloride and vanadium dichloride to produce vanadium trichloride.

16. The process according to claim 15 which is continuous.

17. The process according to claim 1, wherein solar power is used as a source of heat for at least one of the reactions.

18. The process according to claim 1, wherein a source of heat for at least one of the reactions is selected from the group consisting of exhaust from a gas turbine, flue gases, waste heat from any chemical reactions where heat is available, foundry cooling processes, burning of off-gases from a refinery, and oil and natural gas well, intentional burning of lower BTU gases which produce a lower flame temperature than pure fuels, and the burning of any fuels for the purpose of generating hydrogen and oxygen.

19. The process according to claim 1, further comprising feeding the produced hydrogen into an integrated gas combination cycle.

20. The process according to claim 1, further comprising feeding the produced hydrogen into a gas turbine to generate electricity.

21. The process according to claim 1, further comprising feeding the produced hydrogen into a process for generating natural gas from coal.

22. The process according to claim 1, further comprising feeding the produced hydrogen into a process for refining crude oil.

23. A process for the thermochemical decomposition of hydrogen chloride comprising reacting vanadium trichloride using heat and iron trichloride as a catalyst to form chlorine gas and vanadium dichloride; reacting the vanadium dichloride with hydrogen chloride using heat to form hydrogen and chlorine gas, wherein the vanadium trichloride is reformed by reacting the vanadium dichloride with the hydrogen chloride, and further wherein the heat used in all reactions is at a temperature of about 400° C. and below.

* * * * *